(12) United States Patent
Villafranca et al.

(10) Patent No.: US 12,696,079 B2
(45) Date of Patent: Jul. 28, 2026

(54) SYSTEM AND METHOD FOR CELLULAR ORIGINATION IDENTIFICATION

(71) Applicant: Arbeit Software LLC, Cheektowaga, NY (US)

(72) Inventors: Alex Villafranca, Oakland, FL (US); Gregory Houston, Orchard Park, NY (US)

(73) Assignee: ARBEIT SOFTWARE LLC, Cheektowaga, NY (US)

( * ) Notice: Subject to any disclaimer, the term of this patent is extended or adjusted under 35 U.S.C. 154(b) by 430 days.

(21) Appl. No.: 18/525,957

(22) Filed: Dec. 1, 2023

(65) Prior Publication Data

US 2024/0187845 A1    Jun. 6, 2024

Related U.S. Application Data

(60) Provisional application No. 63/429,378, filed on Dec. 1, 2022.

(51) Int. Cl.
| | |
|---|---|
| *H04W 8/26* | (2009.01) |
| *H04W 4/16* | (2009.01) |

(52) U.S. Cl.
CPC .............. *H04W 8/26* (2013.01); *H04W 4/16* (2013.01)

(58) Field of Classification Search
CPC .................................. H04W 8/26; H04W 4/16
USPC ....................................................... 455/414.1
See application file for complete search history.

(56) References Cited

U.S. PATENT DOCUMENTS

| | | | | |
|---|---|---|---|---|
| 10,554,821 | B1* | 2/2020 | Koster .................. | H04M 3/436 |
| 10,972,602 | B1* | 4/2021 | Lang .................. | H04M 3/42051 |
| 2011/0026468 | A1* | 2/2011 | Conrad ............. | H04M 15/8044 |
| | | | | 455/445 |
| 2019/0261141 | A1* | 8/2019 | Backhaus ............. | H04W 76/10 |
| 2020/0336314 | A1* | 10/2020 | Barakat ............... | H04L 65/1104 |
| 2021/0120123 | A1* | 4/2021 | Lang ................... | H04M 3/2281 |

* cited by examiner

*Primary Examiner* — Qutbuddin Ghulamali
(74) *Attorney, Agent, or Firm* — Lippes Mathias LLP

(57) ABSTRACT

A system and method for automatically determining when a phone number has been improperly negatively labelled, such as spam, by a carrier or third-party labelling service. The system and method use a pool of registered cellular devices to monitor a user provided originating call number, specifically monitoring the originating call number label being attributed to the originating call number by a plurality of carriers represented in the pool of registered mobile devices. After checking the labeling status of a phone number, the system can automatically take corrective action by either correcting the user's number's incorrect label or pulling the user's number from active use.

21 Claims, 4 Drawing Sheets

SYSTEM AND METHOD FOR CELLULAR ORIGINATION IDENTIFICATION

CROSS REFERENCE TO RELATED PATENT(S) AND APPLICATION(S)

This application claims the benefit of U.S. Provisional Application No. 63/429,378 filed Dec. 1, 2022, and entitled A SYSTEM AND METHOD FOR CELLULAR ORIGINATION IDENTIFICATION, which is hereby incorporated in its entirety by reference.

BACKGROUND

This disclosure relates to systems and methods that provide automated origination identification of cellular communications, specifically identifying labels associated with cellular telephone calls.

Call labelling is performed by carriers and third-party services. A "label" is a category attached to a call that can be displayed on a mobile device. The label text varies, but "Scam Likely" or "Potential Spam" or "Spam Risk" are three examples.

Calls may be labelled before they arrive on a mobile device, or they may be labelled by screener software running on the mobile device. If a call is labelled before it arrives, the label is conveyed to the device via a caller ID name field. If a call is labelled after it arrives, by a call screener application, it is conveyed to the phone application via a contact name field. Additionally, a Secure Telephony Identity Revisited (STIR)/Signature-based Handling of Asserted information using toKENS (SHAKEN), i.e., STIR/SHAKEN verdict, may be present in the call data. All three pieces of data are ultimately assembled by the phone's default dialer application and used to display a complete label to the end user.

Improper or incorrect call labeling by a carrier or third party can cause problems for business callers attempting to contact clients, customers, suppliers and the like. The improper labeling of an originating call as spam will most likely result in the receiving party not answering the call because of spam filtering by the called device and/or screening by the user of the called device, even though the originating call is not spam. Furthermore, the improper call labeling of an originating call number is unknown to the user, i.e. original dialer, of the improperly labeled originating call number. Consequently, for example, a business such as a medical practice, may be unable to contact a patient for reasons unknown to the medical practice.

This disclosure, and the example embodiments described herein, provide systems and methods for cellular origination label identification and reporting to a user, thereby enabling a user or the system to take corrective action to have the originating call number properly labeled and/or remove the improper label, i.e. spam. The benefit to the user of the disclosed systems and methods is a more efficient and controlled manner of managing telephone calls to their clients, customers, suppliers, etc., as well as a more proactive process to actively monitor and manage the labeling of their originating call umbers.

BRIEF DESCRIPTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

In accordance with one example embodiment of the present disclosure, disclosed is a call origination label identification system for monitoring call origination labels associated with one or more user origination phone numbers, the system comprising: one or more processors tor executing instructions; and at least one memory for storing instructions, which when executed by at least one of the one or more processors configure the system to perform a method comprising: receiving a user phone number for cellular origination label monitoring and reporting; completing a plurality of outgoing calls to a plurality of registered mobile devices included in a pool of registered mobile device using the user phone number as an originating call number, each of the plurality of registered mobile devices configured to communicate over a single cellular network and the pool of registered mobile devices collectively configured to communicate over a plurality of cellular networks and each of the called registered mobile devices receiving call origination label data associated with a received outgoing call, the call origination label data including an origination call category that categorizes the origination call as one of spam or non-spam; a custom dialer application running on each of the called registered mobile devices identifying the received outgoing call label data for each received outgoing call, and communicating the call origination label data and a respective mobile device phone number to an administrative device; the administrative device recording the received call origination label data and respective mobile device ID for each of the called registered mobile devices and associating the call origination label data with the respective outgoing call to the respective registered mobile device; and the administrative device reporting to the user the call origination label data associated with the user phone number for each of the plurality of cellular networks.

In accordance with another example embodiment of the present disclosure, disclosed is a call origination label identification method for monitoring call origination labels associated with one or more user origination phone numbers, the method comprising: an administrative server receiving a user phone number for cellular origination label monitoring and reporting; the administrative server completing a plurality of outgoing calls to a plurality of registered mobile devices included in a pool of registered mobile device using the user phone number as an originating call number, each of the plurality of registered mobile devices configured to communicate over a single cellular network and the pool of registered mobile devices collectively configured to communicate over a plurality of cellular networks and each of the called registered mobile devices receiving call origination label data associated with a received outgoing call, the call origination label data including an origination call category that categorizes the origination call as one of spam or non-spam; a custom dialer application running on each of the called registered mobile devices identifying the received outgoing call label data for each received outgoing call, and communicating the call origination label data and a respective mobile device phone number to an administrative device; the administrative device recording the received call origination label data and respective mobile device ID for each of the called registered mobile devices and associating the call origination label data with the respective outgoing call to the respective registered mobile device; and the administrative device reporting to the user the call origination label data associated with the user phone number for each of the plurality of cellular networks.

In accordance with another example embodiment of the present disclosure, disclosed is A call origination label identification system for monitoring call origination labels associated with one or more user origination phone numbers, the system comprising: an administrative server operatively connected to connected to a network and configured to initiate calls to a cellular phone number over a cellular network; and a pool of registered mobile devices collectively configured to communicate over a plurality of cellular networks, each mobile device registered with the administrative server, each registered mobile device configured to communicate over a single cellular network included in the plurality of cellular networks, and each registered mobile device running a custom dialer application to identify received outgoing call label data initiated by the administrative server and communicate the call origination label data to the administrative server by calling the administrative server, wherein the administrative server and pool of registered mobile devices are configured to perform a method comprising: receiving a user phone number for cellular origination label monitoring and reporting; completing a plurality of outgoing calls to the plurality of registered mobile devices using the user phone number as an originating call number, and each of the called registered mobile devices receiving the call origination label data associated with the received outgoing call, the call origination label data including an origination call category that categorizes the origination call as one of spam or non-spam; the custom dialer application running on each of the called registered mobile devices identifying the received outgoing call label data for each received outgoing call, and communicating to the administrative server the call origination label data and a respective mobile device phone number to the administrative server; the administrative server recording the received call origination label data and respective mobile device ID for each of the called registered mobile devices and associating the call origination label data with the respective outgoing call to the respective registered mobile device; and the administrative device reporting to the user the call origination label data associated with the user phone number for each of the plurality of cellular networks.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
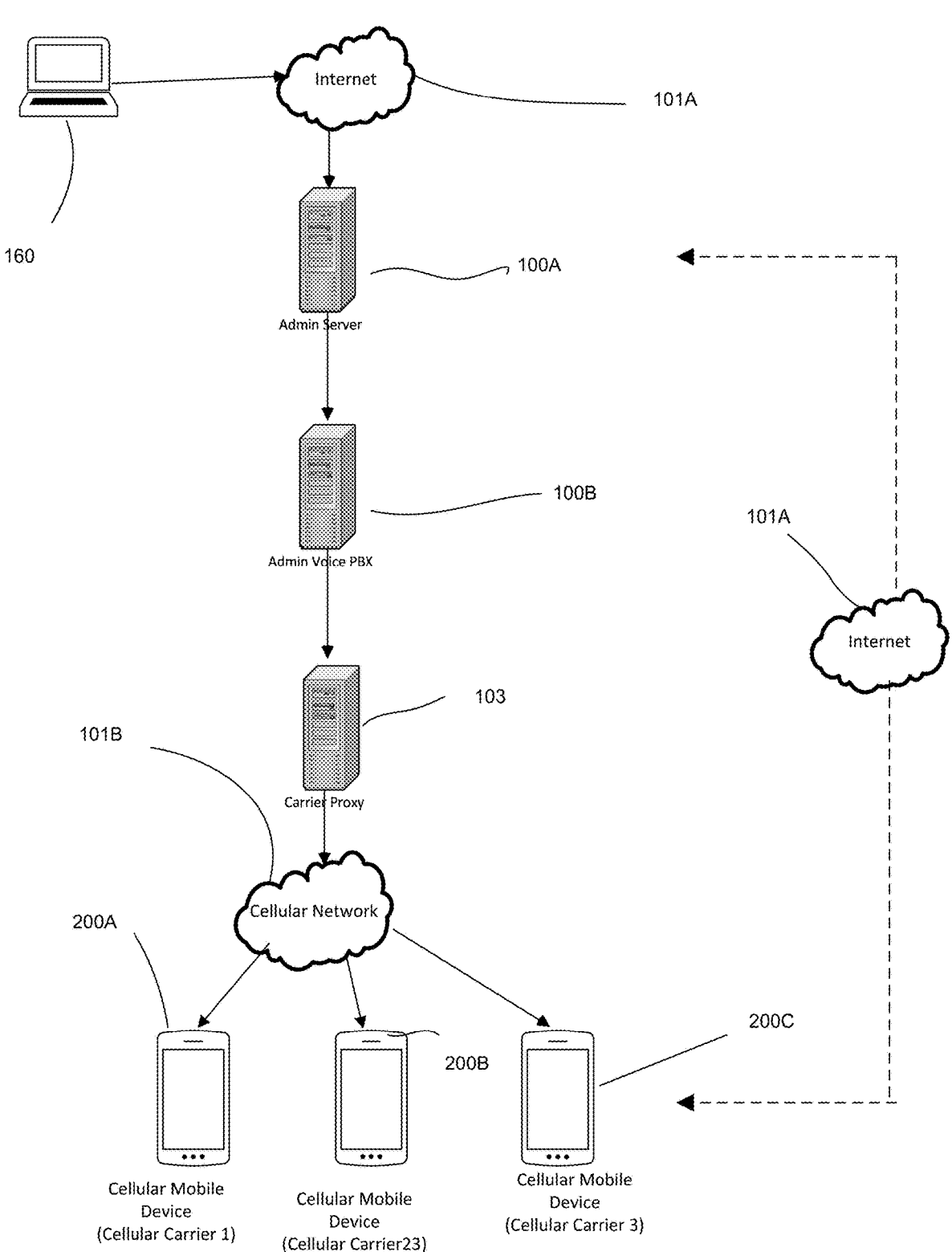
FIG. 1 illustrates a system for cellular origination identification in accordance with one embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second and third does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The term "Numberlab Server", as used herein, refers to an Administration Server.

The term "API", as used herein, refers to Application Programming Interface.

As briefly discussed in the Background section, this disclosure, and example embodiments described herein, provides a system and method for cellular origination label identification and reporting to a user. In addition, the disclosed systems and methods provide corrective action to have the originating call number properly labeled and/or removing the improper label, i.e. spam.

Referring to FIG. 1, shown is an example embodiment of a cellular call origination label identification system and method according to this disclosure. As shown, the system includes the following steps or processes:

1) using a client device, such as a laptop computer 160, a user logs into a website hosted on an admin server 100A via internet cloud 100A;

2) the admin server 100A controls website access, cell phone management and call number monitoring;

3) admin server 100A instructs a voice server 100B to make phone calls, using a user's originating call number, to physical cell phones, i.e. a pool of dedicated registered mobile phones, for user originating call number label identification, monitoring and/or reporting;

4) outgoing calls associated with the user originating call number are placed and the calls go through a carrier proxy 103;

5) the outgoing calls traverse the public switched telephone network (PSTN) and have originating call number labels applied to the calls, either by the carrier or a third part labeling service provider to the carrier; and 6) the physical cell phone pool 200A, 200B and/or 200C receives a call via a cellular network 101B and reports any labels back to the admin Server 100A.

Additional details of the systems and processes are as follows, without any particular reference to the FIGURES, and provides a textual description of example embodiments of a Call Initiation and Data Collection Process, a Client-Facing Dashboard, and a Custom Dialer Software Application, which will also be further described with reference to FIGS. 2-4 herein.

Call Initiation and Data Collection Process

A) Originating User Call Number Listing by Administrative Server

The process begins with the administrative server, which has a compiled list of phone numbers from one or more users that need to have call labels checked.

B) Private Branch Exchange (PBX) and Session Initiation Protocol (SIP) Configuration The system uses ASTERISK and FREEPBX for call initiation and management. Each user phone number from the list is used to initiate a call. This is done via a PBX system, leveraging the SIP. To set the outgoing caller ID, the 'FROM' header in the SIP INVITE request is modified, making it appear as though the call originates from the number being checked.

C) Connection to the PSTN Through Trunk

The call is routed out of the PBX to the Public Switched Telephone Network (PSTN). This connection is established through a trunk line, which serves as a bridge between the PBX and the PSTN.

D) Carrier Routing

Once on the PSTN, the call is handled by various carriers. It eventually reaches the terminating carrier, which is one of the major mobile network operators: such as VERIZON, AT&T, or T-MOBILE.

E) Spam Identification by Terminating Carrier

The terminating carrier assesses the origination number. It checks against its database or a third-party service to see if the number is flagged as spam. This determination is conveyed in the CNAM (Caller Name) record sent to the destination device. For example, the CNAM might read 'Potential Spam'.

F) Data Reception at Mobile Device

The mobile device, upon receiving a call, collects several pieces of information: the time of the call, the origination number, the CNAM record, and its own number. This data is bundled into a packet.

G) Feedback to Administrative Server

The packet is sent back to the administrative server via an internet connection, using an API call. This transmission is done over HTTP and secured using HTTPS, ensuring data integrity and security. The administrative Server correlates this incoming data with the outgoing call it initiated, providing a complete picture of the call's journey and how it was labeled by the carrier.

H) Server-Side Data Correlation and Analysis

The administrative server joins data between the outgoing and incoming call logs. This is based on the ID of the device that received the call and the origination number. A comparison is made with the last recorded data for each origination number. A simple 'diff' is performed to identify any status changes, such as a number being newly labeled as spam.

I) Reporting

Optionally, if a client has a registered email address, the results computed in the previous step are summarized in an email and sent out automatically. Alternatively, a user can access a web portal to view the results.

Client-Facing Dashboard

A web-based dashboard allows clients to view reports generated after the analysis. Clients can manage their phone number lists, add or remove numbers, and categorize them using tags for easier reporting.

Main Dashboard Overview

From this web page, a client can access their most recent results in a table, along with a summary telling them how many numbers are being checked in total, and how many numbers currently have a negative label.

Number Management Page

From this web page, clients can add numbers in bulk, delete in bulk, or search their existing numbers by tag.

Custom Dialer Software on Mobile Device

A) Development & Configuration

The custom dialer mobile device application includes a shell of a standard dialer application, developed using standard tools and techniques for ANDROID devices. The custom dialer application is deployed to all mobile phone devices in the phone bank using ANDROID EMM management software. The custom dialer is set as the default dialer on the mobile device, automatically activating for incoming call, and functioning primarily as a data collection tool and mobile device health checker, rather than a standard dialer.

B) Functionality of the Custom Dialer

B1) Call Data Extraction

On receiving an incoming call, the custom dialer extracts key information: time of the call, origination number, and the CNAM record. This data is crucial for the administrative server to correlate outgoing and incoming call information.

B2) Secure Data Transmission

The extracted call information (time, origination number, CNAM record) is sent back to the administrative server, along with the mobile device's telephone number. Transmission is conducted over HTTP and secured with HTTPS to ensure data integrity and security.

B3) Regular Updates and Device Health Monitoring

The dialer regularly sends updates to the administrative server, including the device's battery life, connectivity status, and time of the last incoming call. These updates allow the administrative server to monitor the device's health and status. If issues such as low battery or poor connectivity are detected, the server may choose not to send additional calls to the device, enhancing the efficiency and reliability of the data collection process.

Additional details of example call origination label identification systems and methods for monitoring call origination labels are now described with reference to FIGS. 2-4.

Figure 2:
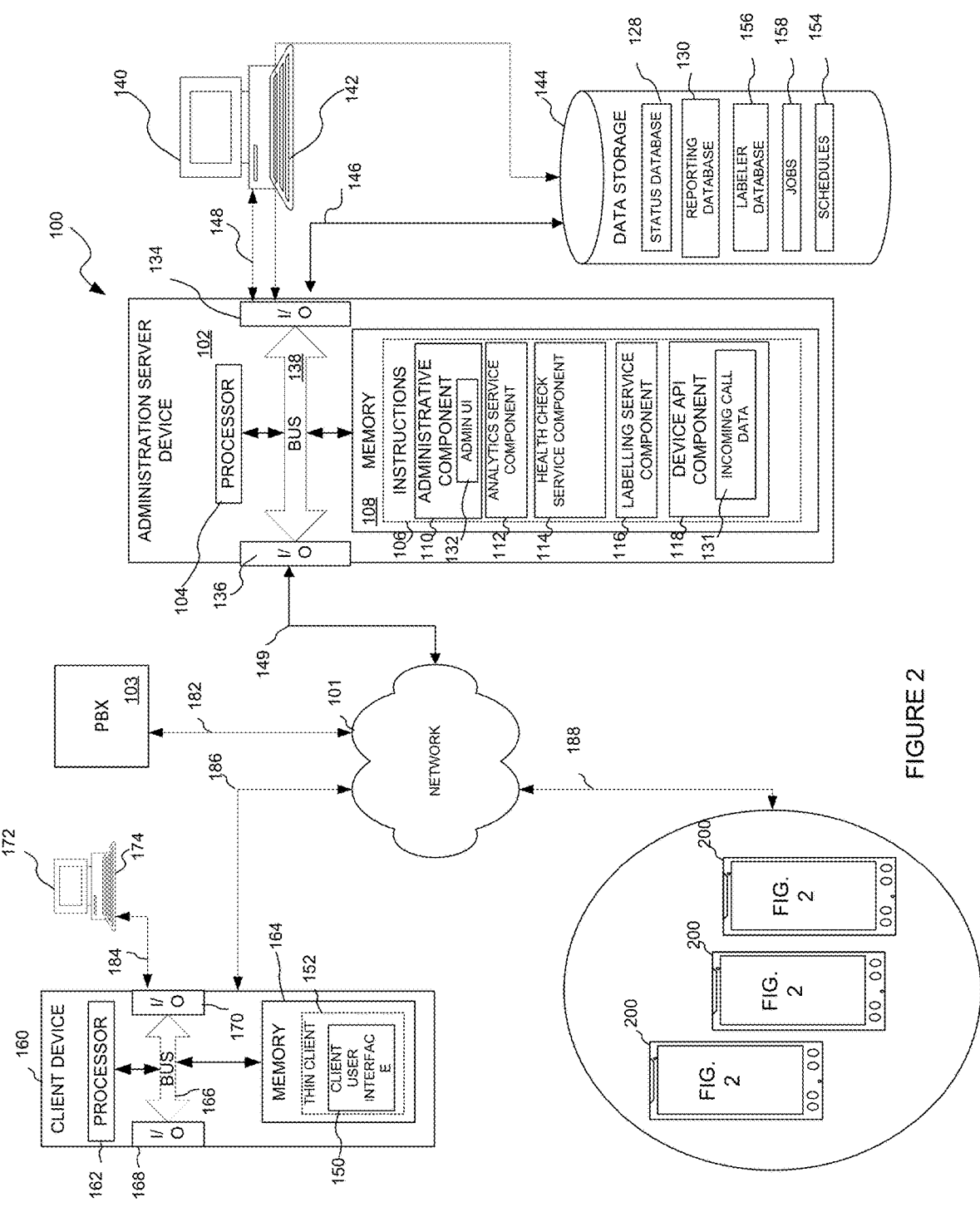
FIG. 2 illustrates further details of a system for cellular origination identification in accordance with one embodiment.

Turning now to FIG. 2, there is shown an illustrative diagram of a system 100 for cellular origination identification in accordance with one embodiment of the subject application. It will be appreciated that the various components depicted in FIG. 1 are for purposes of illustrating aspects of the example embodiment, and that other similar components, implemented via hardware, software, or a combination thereof, are capable of being substituted therein.

As shown in FIG. 2, the cellular origination identification system 100 includes an administrative server device 102 (hereinafter server 102) configured to interact with a plurality of different devices and components, as are illustrated therein. The system 100 further includes at least one private branch exchange (PBX) 103 in communication with the components illustrated in FIG. 2 via a suitable communications link 182. In accordance with one example embodiment, the PBX 103 may be implemented as an ASTERISK® software implementation of a private branch exchange on the server 102, and is illustrated in FIG. 2 as a separate component solely for illustrative purposes, as will be appreciated by those skilled in the art. The system 100 further includes at least one client device 160 in communication with the server 102 via a suitable communications network 101 (as discussed in greater detail below). In addition, the cellular origination identification system 100 further includes one or more mobile devices 200 representative of a variety of cellular network providers, device manufacturers, software platforms, and the like. Additional description of the mobile devices 200 is provided below with respect to FIG. 3.

In accordance with some embodiments, prior to operating the system 101, an administrative user, via the server 102, registers one or more mobile devices 200. This is done by installing a custom dialer application 214 on the mobile device 200 (as illustrated in FIG. 3). For each registered mobile device 200, the system 102 records its phone number, the device's mobile carrier, the device's platform (ANDROID or iOS), and the device's model. According to one example embodiment, the customer dialer, when running on a respective mobile device, performs a self-registering process.

Next, a user, via the client device 160 (or via communication to the server 102) uploads a list of numbers to be monitored. The user specifies how frequently the numbers should be checked. One or more lists may be uploaded, with separate monitoring schedules for each. Each list and schedule combination is called a job 158.

At regular intervals, e.g., daily, hourly, weekly, bi-weekly, monthly, etc., the system 100 executes all user jobs 158. If a job 158 is ready to be run, the server 102 retrieves the numbers for the job 158 and the set of currently active carriers, e.g., AT&T, VERIZON WIRELESS, SPRINT, T-MOBILE, METROPCS, U.S. CELLULAR, ALLTEL, BOOST MOBILE, NEXTEL, AND VIRGIN MOBILE. MINOR CARRIERS: ALASKA COMMUNICATIONS SYSTEMS (ACS), APPALACHIAN WIRELESS (EKN), BLUEGRASS CELLULAR, CELLULAR ONE OF EAST CENTRAL IL (ECIT), CELLULAR ONE OF NORTH-EAST PENNSYLVANIA, CINCINNATI BELL WIRE-LESS, CRICKET, CORAL WIRELESS (MOBI PCS), COX, CROSS, ELEMENT MOBILE (FLAT WIRELESS), EPIC TOUCH (ELKHART TELEPHONE), GCI, GOLDEN STATE, HAWKEYE (CHAT MOBILITY), HAWKEYE (NW MISSOURI), ILLINOIS VALLEY CELLULAR, INLAND CELLULAR, IWIRELESS (IOWA WIRELESS), KEYSTONE WIRELESS (IMMIX WIRELESS/PC MAN), MOSAIC (CONSOLIDATED OR CTC TELECOM), NEX-TECH WIRELESS, NTELOS, PANHANDLE COMMUNI-CATIONS, PIONEER, PLATEAU (TEXAS RSA 3 LTD), REVOL, RINA, SIMMETRY (TMP CORPORATION), THUMB CELLULAR, UNION WIRELESS, UNITED WIRELESS, VIAERO WIRELESS, and WEST CENTRAL (WCC or 5 STAR WIRELESS). The server 102 then checks each number for each active carrier.

To check a number for a carrier, the server 102 looks for an available mobile device 200 belonging to that carrier. When a device 200 for that carrier is available, the server 102 calls it with one of the numbers from the current job 158. There may be many devices 200 available per carrier. In that case, the server 102 places one call to every available device 200, allowing for capacity to be added to the system 100 dynamically, in response to increased load.

When an outgoing call is placed, the call's origination number (the number the system is checking) and the call's target device ID are both recorded in an outgoing call log. When a registered mobile device 200 receives a call, the custom dialer application 214 pulls the following information from the incoming call data and sends it to the labelling system: 1) incoming caller ID name 216, 2) STIR/SHAKEN verdict 220, and 3) call screener contact information 218. This information is bundled and sent to the server 102 via a suitable communications link and protocol, e.g., HTTP.

When the server 102 receives incoming call data from a mobile device 200, it first uses the device's phone number to look up the device's internal ID. The server 102 then uses the origination number for the incoming call of the mobile device 200 to find the corresponding outgoing call log entry. If an outgoing call log entry is found, the server 102 relates the outgoing call to the incoming call, and finally records the caller ID name 216, call screener contact information 218, and STIR/SHAKEN verdict 220 for this call. These three pieces of data, i.e., 216-220, taken together constitute the number's label.

In some embodiments, the server 102 is configured to report results for jobs 158 via a web-based user interface, i.e., the client user interface 150. Via the client user interface 150, a client user may view current and historical results for their jobs 158. The client user interface 150 enables the client device 160 to retrieve reports for one or more numbers for any date range specified. In some embodiments, for all numbers included in the report, all job 158 runs that fell within the date range are specified and the number's per-carrier label is listed for each run. The system 100 may also use this reporting data to score a user's number and, if the score falls below a certain threshold, take automatic action to either correct the number's label or pull the number from active use.

The example server 102 includes a processor 104, which performs the example methods by execution of processing instructions 106 that are stored in memory 108 connected to a processor 104, as well as controlling the overall operation of the computer system 102.

The instructions 106 include an administrative component 110 that is configured to generate an administrative user-interface 132 accessible by a system administrator. In some embodiments, the administrative user-interface 132 generated by the administrative component 110 provides a dashboard, e.g., textual or graphical user interface, for registering and managing devices, e.g., client devices 160, mobile devices 200, etc., registering carriers and allowing for system monitoring.

The instructions 106 stored in memory 108 further include an analytics service component 112 configured to gather results of a job 158 performed by the labeling service component 116 (discussed below). The analytics service component 112 may further be configured to bundle the results of a job 158 into a suitable efficient format for querying and reporting.

As illustrated in FIG. 2, the instructions 106 also store a health check service component 114 configured to monitor the communication connection between the system 100 and the PBX 103, as well as all other external devices. In some embodiments, the health check service component 114 may be configured to gather data relating to connectivity checks at regular intervals, as well as to provide such data to the administrative component 110. In other embodiments, the health check service component 114, in conjunction with the labeling service component 116, may remove one or more mobile devices 200 from active rotation if they become unavailable.

The instructions 106 also include a labelling service component 116, configured to periodically query jobs 158 and determine when such jobs 158 are to be run. In accordance with one embodiment, a user-defined schedule 154 determines which jobs 158 are to be processed. When a list of jobs 158 is compiled, the labeling service component 116 communicates with the PBX 103 to place a call to one active device 200 per-carrier to be checked. The labeling service component 116 may be implemented to define the relationship between an outgoing call, an incoming call, and the label for the incoming call, e.g., the labeler data 156.

Additionally, the instructions 106 stored in memory 108 of the example server 102 also include a device API component 118 configured to record incoming call data sent to the server 102 from a registered mobile device 200. The device API component 118 may be configured to forward such incoming call data to the labelling service component 116.

The various components of the server device 102 may all be connected by a data/control bus 138. The processor 104 of the server device 102 is in communication with an associated data storage 144 via a communications link 146. A suitable communications link 146 may include, for example, the public switched telephone network, a proprietary communications network, infrared, optical, or other suitable wired or wireless data communications. The data storage 144 is capable of implementation on components of the server device 102, e.g., stored in local memory 108, i.e., on hard drives, virtual drives, or the like, or on remote memory accessible to the server device 102.

The associated data storage 144 corresponds to any organized collections of data (e.g., report information, status information, carrier information, labels, jobs, scheduling information, client information, user interface information, dialer programs/applications, monitoring programs/applications, mobile device information, mobile device operating system information, user information, logs, call information, STIR/SHAKEN verdicts, etc.) used for one or more purposes. Implementation of the associated data storage 144 is capable of occurring on any mass storage device(s), for example, magnetic storage drives, a hard disk drive, optical storage devices, flash memory devices, or a suitable combination thereof. The associated data storage 144 may be implemented as a component of the server device 102, e.g., resident in memory 108, or the like. In one embodiment, the associated data storage 144 may include data corresponding to reporting data 130, status data 128, jobs 158, labeler data 156, schedules 154, and the like.

The server device 102 may include one or more input/output (I/O) interface devices 134 and 136 for communicating with external devices. The I/O interface 134 may communicate, via communications link 148, with one or more of a display device 140, for displaying information, a user input device 142, such as a keyboard or touch or writable screen for inputting text, and/or a cursor control device, such as mouse, trackball, or the like, for communicating user input information and command selections to the processor 104. The I/O interface 136 may communicate over communications link 149 and via the network 101 to the mobile devices 200, client devices 160 and PBX 103.

It will be appreciated that the system 100 is capable of implementation using a distributed computing environment, such as a computer network or cloud-based computing platform, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 2 as a networked set of components, the system and method are capable of implementation on a standalone device adapted to perform the methods described herein.

The server device 102 may include a computer server, workstation, personal computer, cellular telephone, tablet computer, pager, combination thereof, or other computing device capable of executing instructions for performing the example method.

According to one example embodiment, server device 102 includes hardware, software, and/or any suitable combination thereof, configured to interact with an associated user, a networked device, networked storage, remote devices, or the like.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 134, 136 allow the computer to communicate with other devices via a computer network, and may comprise a modulator/demodulator (MODEM). Memory 108 may store data the processed in the method as well as the instructions for performing the example method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the server device 102, executes instructions 106 stored in memory 108 for performing the method described herein.

The system 100 of FIG. 2 further includes at least one client device 160 in communication with the server device 102 via a suitable network, e.g., the network 101, as discussed below. The example client device 160 may be configured to interact with the server device 102, as are illustrated therein. The client device 160 includes a processor 162 in communication with memory 164 that is configured to execute instructions and applications stored therein. In accordance with the example embodiment, the memory 164 stores a thin client 152 application that is configured to present a client user interface 150 to an associated user. In some embodiments, the thin client 152 application may be implemented as a suitable web browser capable of accessing and presenting the client user interface 152, thereby presenting information and data received from the server 102, inputting requests, jobs 158, schedules 154, etc.

The client device 160 may include one or more input/output (I/O) interface devices 168 and 170 for communicating with external devices. The I/O interface 170 may communicate, via communications link 184, with one or more of a display device 172, for displaying information, a user input device 174, such as a keyboard or touch or writable screen, for inputting text, and/or a cursor control device, such as mouse, trackball, or the like, for communicating user input information and command selections to the processor 162.

It will be appreciated that the system 100 is capable of implementation using a distributed computing environment, such as a computer network or cloud-based computing platform, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 2 as a networked set of components, the system and method are capable of implementation on a standalone device adapted to perform the methods described herein.

The client device 160 may include a computer server, workstation, personal computer, cellular telephone, tablet computer, pager, combination thereof, or other computing device capable of executing instructions for performing the example method.

According to one example embodiment, the client device 160 includes hardware, software, and/or any suitable combination thereof, configured to interact with an associated user, a networked device, networked storage, remote devices, or the like.

The memory 164 may represent any type of non-transitory computer readable medium such as random access memory (RAM), read only memory (ROM), magnetic disk or tape, optical disk, flash memory, or holographic memory. In one embodiment, the memory 164 comprises a combination of random access memory and read only memory. In some embodiments, the processor 162 and memory 164 may be combined in a single chip. The network interface(s) 168, 170 allow the computer to communicate with other devices via a suitable communications link 186 to a computer network 101, and may comprise a modulator/demodulator (MODEM). Memory 164 may store data the processed in the method as well as the instructions for performing the example method.

The processor 162 can be variously embodied, such as by a single core processor, a dual core processor (or more generally by a multiple core processor), a digital processor and cooperating math coprocessor, a digital controller, or the like. The processor 162, in addition to controlling the operation of the client device 160, executes instructions and applications stored in memory 164 for performing the method described herein.

In addition to the foregoing, the system 100 includes one or more mobile devices 200, in communication with the server device 102 and/or the PBX 103 via communication link 188.

That is, the mobile devices 200 may utilize a communications link 188 with the server device 102 and/or PBX 103, which allows transmission of call information to the server device 102. In one embodiment, the mobile device 200 may be implemented as a smartphone employing an operating system such as IOS, ANDROID, BLACKBERRY, WINDOWS, or the like. The mobile device 200 is representative of any personal computing devices, such as personal computers, netbook computers, laptop computers, workstation computers, personal data assistants, web-enabled cellular telephones, tablet computers, proprietary network devices, or other web-enabled electronic devices. The data communications link 188 between the mobile device 200 and the server device 102 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications. In one embodiment, the mobile device 200 may communicate with the server 102 via the network 101.

Figure 3:
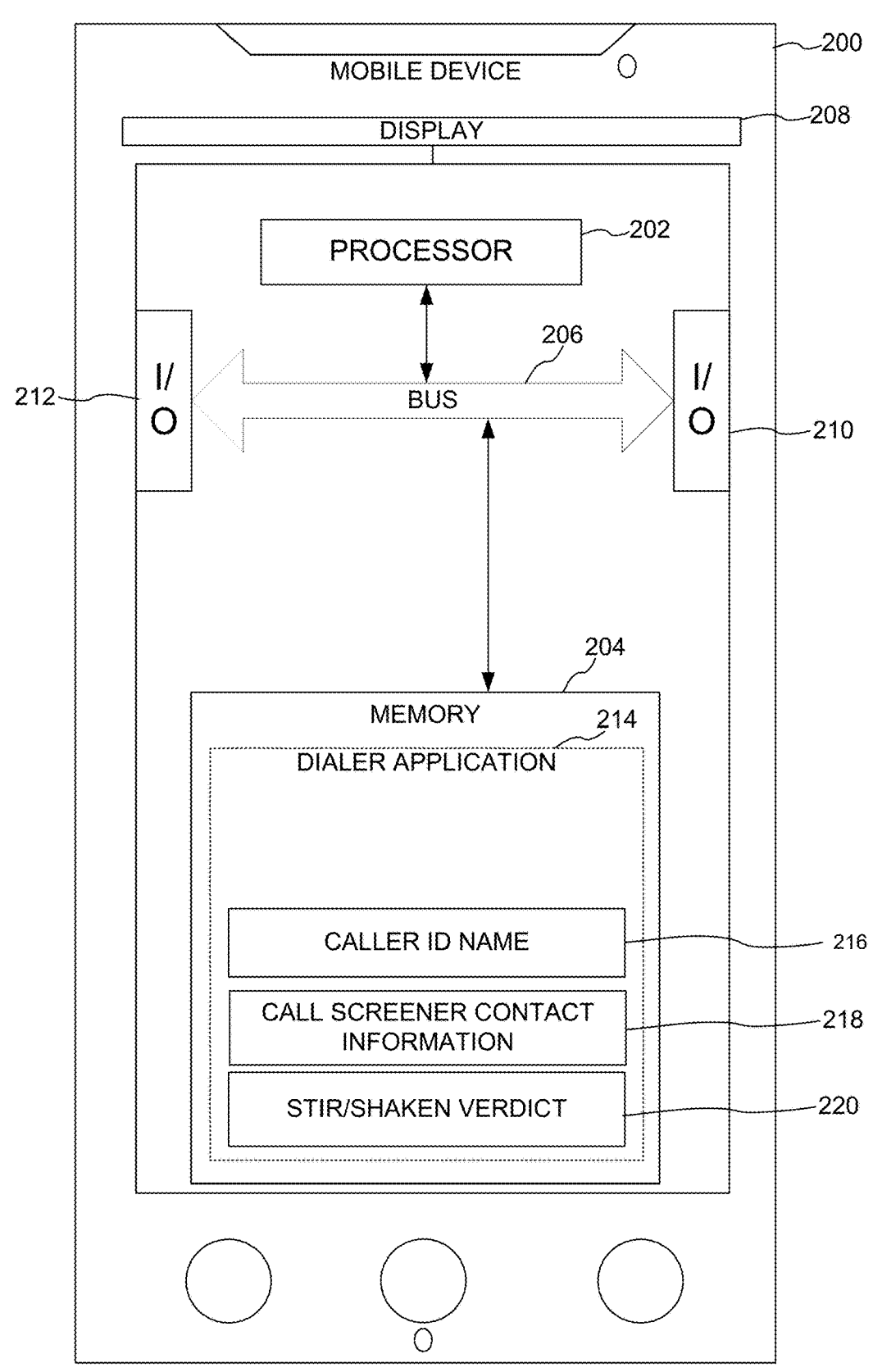
FIG. 3 is an illustrative diagram of a mobile device utilized in the system for cellular origination identification in accordance with one embodiment.

FIG. 3 provides an example illustration of an example mobile device 200 representative of the mobile devices depicted in FIG. 2. The mobile device 200 includes a processor 202, which executes one or more instructions or applications 214 in the performance of an example method discussed herein. The mobile device 200 further includes a memory 204 storing the mobile dialer application 214 in data communication with the processor 202 via a system bus 206. The processor 202 of the mobile device 200 is in data communication with the server device 102 via an I/O interface 210 and/or 212. The mobile device 200 further includes a display 208 suitably configured to display data to an associated user, receive input from the associated user, display caller ID name 216, and the like. In some embodiments, the display 208 of the mobile device 200 may be configured as a touch-screen display capable of receiving user instructions via user contact on the display, e.g., LCD, AMOLED, LED, RETINA, etc., types of touch-screen displays.

The memory 204 may represent any type of non-transitory computer readable medium such as random access memory (RAM), read only memory (ROM), magnetic disk or tape, optical disk, flash memory, or holographic memory. In one embodiment, the memory 204 comprises a combination of random access memory and read only memory. In some embodiments, the processor 202 and memory 204 may be combined in a single chip. The network interface(s) 210, 212 allow the mobile device 200 to communicate with other devices via a communications network, and may comprise a modulator/demodulator (MODEM). Memory 204 may store data the processed in the method as well as the instructions for performing the example method. The digital processor 202 can be variously embodied, such as by a single core processor, a dual core processor (or more generally by a multiple core processor), a digital processor and cooperating math coprocessor, a digital controller, or the like.

The memory 204 of the mobile device 200 includes a dialer application 214. The mobile device 200 may be configured to further store caller ID names 216, call screener contact information 218, STIR/SHAKEN verdicts 220, etc., in memory in conjunction with the application 214. In addition, the memory 204 may store a thin client application or other communication component, enabling the mobile device 200 to communicate with the server device 102 via the network 101, as discussed above.

As will be appreciated, the dialer application 214 collects the caller ID names 216, call screener contact information 218, and STIR/SHAKEN verdicts 220 from calls made to the mobile device 200 by the server device 102. Further, the dialer application 214 may collect and transmit other data to the server device 102, e.g., other data about the mobile device 200, call data, carrier information, and the like.

As shown in FIG. 2, the mobile devices 200 are capable of intermittent (opportunistic) or continuous bi-directional communication with the server 102 utilizing the I/O interface 212. In one embodiment, the bi-directional communication is data communication utilizing a cellular data network, e.g., 3rd generation mobile phone standards (3G), 4th generation standards (4G, 4G LTE, WIMAX), 5th generation standards (5G, etc.), EV-DO, standalone data protocols, and the like. In such an embodiment, the mobile devices 200 communicate with the server 102 using the network 101.

Figure 4:
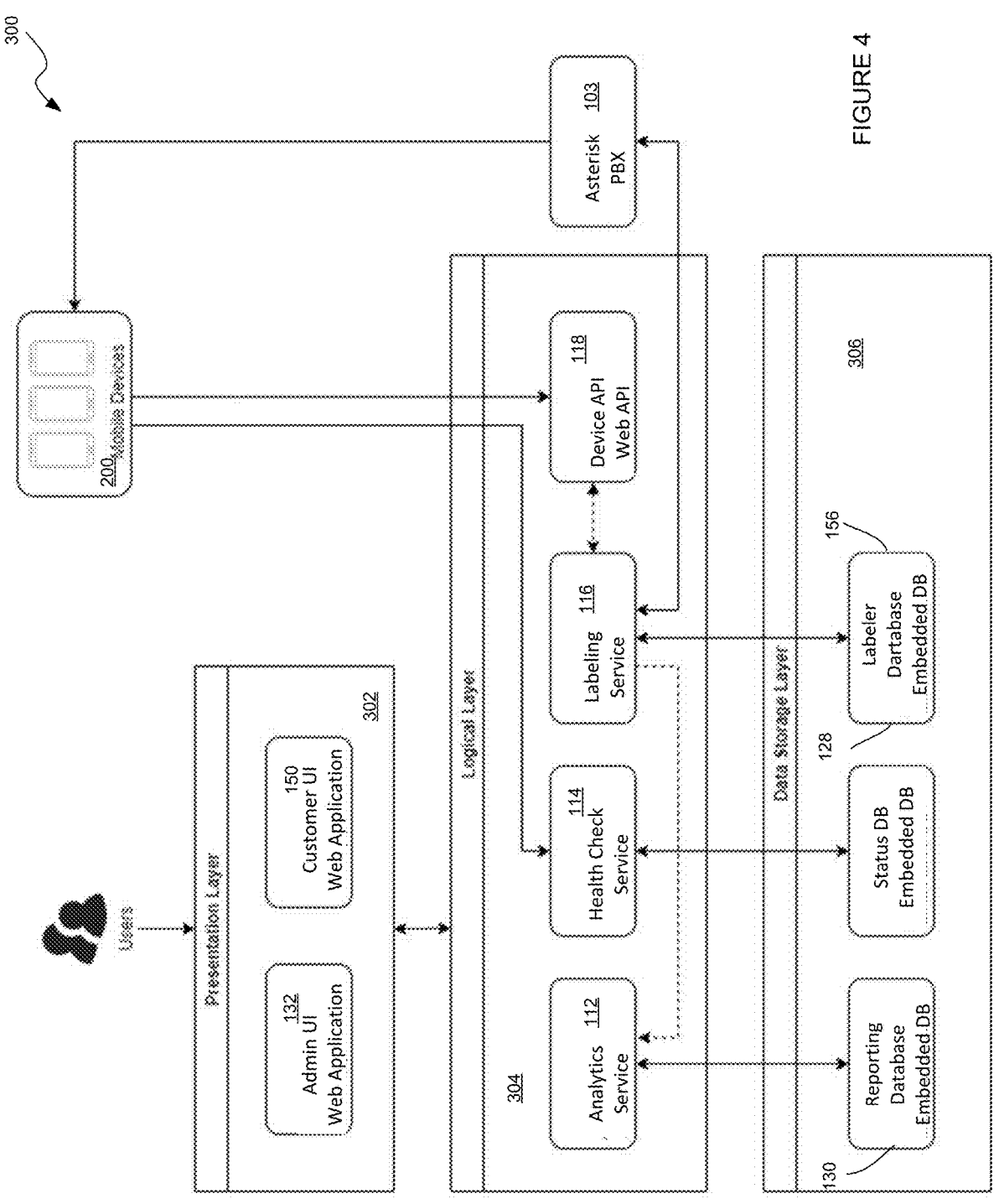
FIG. 4 is a functional block diagram illustrating varying layers of the system for cellular origination identification in accordance with one embodiment.

The foregoing description of components illustrated in FIGS. 2-3 and the interactions thereof, may be better understood in conjunction with the system layer diagram 300 of FIG. 4. That is, the system 100 of FIG. 2 may be implemented as components of three separate layers. FIG. 4 provides an illustration of each such component, the layer location of the component, and the relationships between such components. As shown in FIG. 4, the system 300 includes a presentation layer 302, a logical layer 304, and a data storage layer 306.

The presentation layer 302 includes two user-facing web applications, e.g., the administration user interface (Admin UI) 132, and a client or customer user interface 150. The Admin UI 132 corresponds to an administrative dashboard for registering and managing devices, registering carriers, and system monitoring. The Customer UI 150 corresponds to a dashboard for managing a customer's jobs and viewing the results of jobs previously run.

The logical layer 304 includes three services and one externally available web API. As shown in FIG. 4, the logical layer 304 includes an analytics service 112, health check service 114, labeling service 116, and device API 118. The analytics service 112 may be implemented to be responsible for gathering the results of a job 158 performed by the labelling service 112 and bundling into a format that's efficient for query and reporting. This service 112 generates all user-facing reports. The health check service 114 may be implemented to be responsible for monitoring the system's connection to ASTERISK (i.e., PBX 103) and all external devices (e.g., mobile devices 200). Connectivity checks are performed at regular intervals. The health check service 114 provides the data used to generate the Admin UI's 132 monitoring dashboards. The health check service 114 further communicates with the labelling service 116 to remove mobile devices 200 from active rotation if they become unavailable. The labeling service 116 may be implemented to be responsible for periodically checking a user's jobs 158 to see which are ready to be run. The user-defined schedule 154 determines which jobs 158 need to be checked. When a list is ready, the labeling service 116 uses ASTERISK (i.e., PBX 103) to place a call to one active device 200 per-carrier to be checked. This service 116 is ultimately responsible for defining the relation between an outgoing call, an incoming call, and the label for the incoming call. The device API 118 may be implemented to record incoming call data 131 sent to the system from a registered mobile device. The device API 118 forwards incoming call data to the labelling service 116.

The data storage layer 306 three data storage components, a reporting database 130, a status database 128, and a labeler database 156. Each database 130, 128, 156 in this layer 306 is embedded in the application (i.e., the instructions 106) and accessible only to its corresponding service 112-118. If one service needs data from another service's database, it gets the data by talking to the service responsible for that database, never by accessing the other service's database directly. As shown in FIG. 4, the reporting database 130 stores the results of a job 158 performed by the labelling service 116 in a denormalized form for efficient query and reporting. The status database 128 stores the results of the last health check 114 for each mobile device 200 and ASTERISK (i.e., PBX 103). The labeler database 156 stores all user jobs 158 and schedules 154, the outgoing call log, and the incoming call log, and all call labelling data.

As illustrated in FIG. 4, the system 300 includes mobile devices 200 and external components, e.g., the PBX 102. The mobile devices 200 correspond to a pool of ANDROID and iOS devices that have been registered with the system 100. "Registering" here means a custom dialer application 214 has been installed on the device 200. This dialer 214 is set as the default application for answering calls received by the mobile device 200. For each incoming call, it records the caller ID name 216, the STIR/SHAKEN verdict 220, and any call screener contact information 218 for the call. This information is bundled with the device's phone number and IMEI. That bundle is sent to the device API 118 for use by the labelling service 116.

ASTERISK is an external PBX 103. It receives a request to place a call with a specific origination number to a specific destination number. The origination numbers come from the user-provided list, and the destination number comes from the registered device pool. ASTERISK places the call over the public telephone system.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The example embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the example embodiment is not described with reference to any particular programming language. It will be appreciated that a variety of programming languages may be used to implement the teachings of the example embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A call origination label identification system for monitoring call origination labels associated with one or more user origination phone numbers, the system comprising:

one or more processors tor executing instructions; and at least one memory for storing instructions, which when executed by at least one of the one or more processors configure the system to perform a method comprising:

receiving a user phone number for cellular origination label monitoring and reporting;

completing a plurality of outgoing calls to a plurality of registered mobile devices included in a pool of registered mobile device using the user phone number as an originating call number, each of the plurality of registered mobile devices configured to communicate over a single cellular network and the pool of registered mobile devices collectively configured to communicate over a plurality of cellular networks and each of the called registered mobile devices receiving call origination label data associated with a received outgoing call, the call origination label data including an origination call category that categorizes the origination call as one of spam or non-spam;

a custom dialer application running on each of the called registered mobile devices identifying the received outgoing call label data for each received outgoing call, and communicating the call origination label data and a respective mobile device phone number to an administrative device;

the administrative device recording the received call origination label data and respective mobile device ID for each of the called registered mobile devices and associating the call origination label data with the respective outgoing call to the respective registered mobile device; and the administrative device reporting to the user the call origination label data associated with the user phone number for each of the plurality of cellular networks.

2. The call origination label identification system according to claim 1, wherein the call origination label data includes one or more of a caller ID name, a STIR/SHAKEN verdict and call screener contact information.

3. The call origination label identification system according to claim 1, wherein a user specifies a schedule for monitoring the user phone number call origination labels, and the system executes a job associated with the specified schedule.

4. The call origination label identification system according to claim 3, wherein the system is configured to include a user interface to display current and historical results for the user's jobs using a web-based user interface.

5. The call origination label identification system according to claim 1, wherein the administrative device uses the registered mobile device phone numbers to look up an internal ID associated with the registered mobile devices and uses the originating call number for the registered mobile device's incoming call to locate a corresponding outgoing call log entry, and when the call log entry is located, the system relates the outgoing call log entry to the mobile device's incoming call and records one or more of a caller ID name, STIR/SHAKEN verdict, and call screener contact information for the user phone number.

6. The call origination label identification system according to claim 1, wherein the custom dialer application is configured to self-register a respective mobile device with the administrative device and periodically communicate a status of the respective mobile device to the administrative server.

7. The call origination label identification system according to claim 1, wherein the method performs one of correcting the call origination label data to indicate the user phone number is non-spam or removing the user phone from active service.

8. A call origination label identification method for monitoring call origination labels associated with one or more user origination phone numbers, the method comprising:

an administrative server receiving a user phone number for cellular origination label monitoring and reporting;

the administrative server completing a plurality of outgoing calls to a plurality of registered mobile devices included in a pool of registered mobile device using the user phone number as an originating call number, each of the plurality of registered mobile devices configured to communicate over a single cellular network and the pool of registered mobile devices collectively configured to communicate over a plurality of cellular networks and each of the called registered mobile devices receiving call origination label data associated with a received outgoing call, the call origination label data including an origination call category that categorizes the origination call as one of spam or non-spam;

a custom dialer application running on each of the called registered mobile devices identifying the received outgoing call label data for each received outgoing call, and communicating the call origination label data and a respective mobile device phone number to an administrative device;

the administrative device recording the received call origination label data and respective mobile device ID for each of the called registered mobile devices and associating the call origination label data with the respective outgoing call to the respective registered mobile device; and the administrative device reporting to the user the call origination label data associated with the user phone number for each of the plurality of cellular networks.

9. The call origination label identification method according to claim 8, wherein the call origination label data includes one or more of a caller ID name, a STIR/SHAKEN verdict and call screener contact information.

10. The call origination label identification method according to claim 8, wherein a user specifies a schedule for monitoring the user phone number call origination labels, and the system executes a job associated with the specified schedule.

11. The call origination label identification method according to claim 10, wherein a user interface to displays current and historical results for the user's jobs using a web-based user interface.

12. The call origination label identification method according to claim 8, wherein the registered mobile device phone numbers are used to look up an internal ID associated with the registered mobile devices and the originating call number for the registered mobile device's incoming calls are used b to locate a corresponding outgoing call log entry, and when the call log entry is located, relating the outgoing call log entry to the mobile device's incoming call and recording one or more of a caller ID name, STIR/SHAKEN verdict, and call screener contact information for the user phone number.

13. The call origination label identification method according to claim 8, wherein the custom dialer application self-registers a respective mobile device with the administrative server and periodically communicates a status of the respective mobile device to the administrative server.

14. The call origination label identification method according to claim 8, wherein the method performs one of correcting the call origination label data to indicate the user phone number is non-spam or removing the user phone from active service.

15. A call origination label identification system for monitoring call origination labels associated with one or more user origination phone numbers, the system comprising:

an administrative server operatively connected to connected to a network and configured to initiate calls to a cellular phone number over a cellular network; and a pool of registered mobile devices collectively configured to communicate over a plurality of cellular networks, each mobile device registered with the administrative server, each registered mobile device configured to communicate over a single cellular network included in the plurality of cellular networks, and each registered mobile device running a custom dialer application to identify received outgoing call label data initiated by the administrative server and communicate the call origination label data to the administrative server by calling the administrative server, wherein the administrative server and pool of registered mobile devices are configured to perform a method comprising:

receiving a user phone number for cellular origination label monitoring and reporting;

completing a plurality of outgoing calls to the plurality of registered mobile devices using the user phone number as an originating call number, and each of the called registered mobile devices receiving the call origination label data associated with the received outgoing call, the call origination label data including an origination call category that categorizes the origination call as one of spam or non-spam;

the custom dialer application running on each of the called registered mobile devices identifying the received outgoing call label data for each received outgoing call, and communicating to the administrative server the call origination label data and a respective mobile device phone number to the administrative server;

the administrative server recording the received call origination label data and respective mobile device ID for each of the called registered mobile devices and associating the call origination label data with the respective outgoing call to the respective registered mobile device; and the administrative device reporting to the user the call origination label data associated with the user phone number for each of the plurality of cellular networks.

16. The call origination label identification system according to claim 15, wherein the call origination label data includes one or more of a caller ID name, a STIR/SHAKEN verdict and call screener contact information.

17. The call origination label identification system according to claim 15, wherein a user specifies a schedule for monitoring the user phone number call origination labels, and the system executes a job associated with the specified schedule.

18. The call origination label identification system according to claim 17, wherein the system is configured to include a user interface to display current and historical results for the user's jobs using a web-based user interface.

19. The call origination label identification system according to claim 15, wherein the administrative server uses the registered mobile device phone numbers to look up an internal ID associated with the registered mobile devices and uses the originating call number for the registered mobile device's incoming call to locate a corresponding outgoing call log entry, and when the call log entry is located, the system relates the outgoing call log entry to the mobile device's incoming call and records one or more of a caller ID name, STIR/SHAKEN verdict, and call screener contact information for the user phone number.

20. The call origination label identification system according to claim 15, wherein the custom dialer application is configured to self-register a respective mobile device with the administrative server and periodically communicate a status of the respective mobile device to the administrative server.

21. The call origination label identification system according to claim 15, wherein the method performs one of correcting the call origination label data to indicate the user phone number is non-spam or removing the user phone from active service.

* * * * *